United States Patent
Phan et al.

(10) Patent No.: US 8,818,079 B2
(45) Date of Patent: Aug. 26, 2014

(54) 3D RADIOMETRY

(75) Inventors: Long N. Phan, Somverville, MA (US); Jonathan Lee Jesneck, Enfield, CT (US); Sanjay Sarma, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 214 days.

(21) Appl. No.: 13/568,546

(22) Filed: Aug. 7, 2012

(65) Prior Publication Data

US 2014/0044340 A1  Feb. 13, 2014

(51) Int. Cl.
*G06K 9/00* (2006.01)

(52) U.S. Cl.
USPC ........... 382/154; 382/108; 345/419; 345/427; 250/341.1; 250/341.6

(58) Field of Classification Search
CPC ................ G01J 2005/0081; G01J 2005/0051; G01J 2005/00; G01J 2005/0077; G06K 9/36; G06K 9/00; G06T 2207/10048
USPC ........ 382/154, 108; 345/419, 427; 250/341.1, 250/341.6
See application file for complete search history.

(56) References Cited

U.S. PATENT DOCUMENTS

| 7,769,205 B2 * | 8/2010 | Arias-Estrada et al. ...... 382/106 |
| 8,152,366 B2 * | 4/2012 | Kang et al. .................... 374/136 |

OTHER PUBLICATIONS

J. A. Voogt, "Image representation of complete Urban surface temperatures", Geocarto International Centre, vol. 15, No. 3, Sep. 2000.*

Allinson, *Evaluation of aerial thermography to discriminate loft insulation in residential housing,* (U. Nottingham, 2007).
Meier, et al., Determination of persistence effects in spatio-temporal patterns of upward long-wave radiation flux density from an urban courtyard by means of time-sequential thermography, *Remote Sensing of Environment,* pp. 21-34 (2010).
Cho, et al., 3D Thermal Modeling for Existing Buildings using Hybrid LIDAR System, *Computing in Civil Engineering,* pp. 552-558 (2011).
Yang, et al., Fusion of camera images and laser scans for wide baseline 3D scene alignment in urban environments, *J. Photogram. Remote Sensing* (2011), doi:10.1016/j.isprsjprs.2011.09.004.
Kapoor, et al., Comparison of Techniques for the 3D Modeling and Thermal Analysis, *APEGA* 2010, pp. 163-173 (2010).
Shao, *Detecting Sources of Heat Loss in Residential Buildings from Infrared Imaging,* (MIT Undergraduate Thesis, 2011).
Horn, et al., Determining Optical Flow, *Artificial Intelligence,* vol. 17, pp. 185-203 (1981).
Ham, et al., Rapid 3D Energy Performance Modeling of Existing Buildings using Thermal and Digital Imagery, *ASCE Construction Research Congress* 2012, pp. 991-1000 (2012).

* cited by examiner

*Primary Examiner* — Stephen R Koziol
*Assistant Examiner* — Shaghayegh Azima
(74) *Attorney, Agent, or Firm* — Sunstein Kann Murphy & Timbers LLP

(57) ABSTRACT

Methods and a computer program product for deriving temperature information with respect to surfaces within a scene that is imaged radiometrically. A time sequence of radiometric data is acquired in frames viewed from distinct angles. A three-dimensional structure of the scene is derived, allowing viewing angles and distances to the imaged surfaces to be inferred. Normalized surface areas of the imaged surfaces are calculated based on the inferred viewing angles and emissivities of the imaged surfaces are corrected accordingly. Corrections also account for background radiation impinging on the imaged surfaces. The radiometric data are converted to a perceptible temperature map of the imaged surfaces.

8 Claims, 2 Drawing Sheets
(1 of 2 Drawing Sheet(s) Filed in Color)

3D RADIOMETRY

TECHNICAL FIELD

The present invention relates to novel methods for modeling a three-dimensional (3D) environment in order to correct radiometric measurements on the basis of inferred viewing angles, distances, and surface emissivities.

BACKGROUND ART

Definitions: As used herein and in any appended claims, the term "radiometry" shall refer generally to any measurement of the radiance of electromagnetic radiation within a specified spectral band.

"Radiance" is the electromagnetic power emitted per unit area of a surface per unit solid angle and is typically measured in units of $W/m^2/sr$. "Spectral radiance" is the radiance per unit wavelength, given, say, in $W/m^2/sr/\mu m$.

Radiance is related to the effective temperature of a surface (the product of its temperature and emissivity) in a manner expressed by Planck's law, which, when integrated over all spectral energies, yields the well-known $T^4$-dependence of the Stefan-Boltzmann law. However, measurements over finite spectral energy ranges dictated, say, by band-limited infrared radiation detection, require explicit evaluation of the integral of Planck's law over the band concerned, typically approximated using one of the forms of the Sakuma-Hattori equation, described in Sakuma et al., *Establishing a practical temperature standard by using a narrow-band radiation thermometer with a silicon detector, Temperature: Its Measurement and Control in Science and Industry*, vol. 5, pp. 421-27 (1982), which is incorporated herein by reference, or by other approximation methods.

An image (as defined below) representing the spatial distribution (in a space of any dimensionality) of surface temperature may be referred to as a "thermogram." "Thermography," as used herein and in any appended claims, shall denote the study, by imaging means, of temperature distributions in structures or regions, for example, in buildings.

"Infrared thermography" shall refer to thermography performed in whole, or in part, within the infrared portion of the electromagnetic spectrum, and more particularly, within the so-called "thermal infrared" portion of the spectrum, which need not be precisely defined herein, insofar as the term is used without limitation herein. Long-wave infrared (LWIR) detection [~8-14 μm] is typically employed for mapping temperatures near typical ambient terrestrial temperatures (~300° K.), because emittance (radiance integrated over solid angle) is maximized in that range, and because transmission through mist and smoke is considered superior to that of other spectral ranges.

The term "detector" may be used herein comprehensively, and interchangeably with the term "sensor," with either term applying either to a single detector element or to an array of sensors or detectors, whether sensitive to the flux of impinging photons, or whether sensitive to temperature in radiative equilibrium with a distant source, such as a bolometer. An array of detectors at the focal plane of an optical system may also be referred to, herein, as a camera.

The term "three-dimensional (or 3D) radiometry," as used herein and in any appended claims, shall refer to radiometry, as previously defined, that takes into account the three-dimensional nature of a scene in order to measure the radiance to infer a derived quantity such as a temperature, associated with a particular surface comprising a portion of the scene.

The term "drive-by thermography," as used herein and in any appended claims, is defined as the imaging of urban environments by scanning them from a vehicle on the street and the assignment of temperatures to points on the surfaces of the scene.

One class of application of radiometry entails the imaging of radiance over a specified range of the infrared in order to infer surface temperature maps of complex objects. In applications of this sort, anomalous hot spots, or regions of large thermal gradients, are identified in images and related to physical locations on structures in order to identify radiant energy leakage, for example.

Complications in thermography arise because the mapping of detected radiance to surface temperature is not a simple one, especially when the geometry of the emitting surface is complex. At a minimum, a distance to the emitting surface must be known or assumed, and, similarly, an emissivity must be assumed or otherwise ascertained. That is why Cho et al., 3D *Thermal Modeling for Existing Buildings using Hybrid LIDAR System, Computing in Civil Engineering*, pp. 552-58 (2011), incorporated herein by reference, teaches the concomitant application of a second modality (LIDAR, in that case) in order to associate a distance with distinct points associated with the imaged scene. Similarly, Yang et al., *Fusion of camera images and laser scans for wide baseline 3D scene alignment in urban environments, J. Photogram. Remote Sensing* (2011), doi:10.1016/j.isprsjprs.2011.09.004, albeit not in a thermographic context, employs information separately derived from a laser scanner in order to build a third dimension into an otherwise two-dimensional image.

Aerial thermography, as applied to urban scenes, for example, by Allinson, *Evaluation of aerial thermography to discriminate loft insulation in residential housing*, (U. Nottingham, 2007) to the roofs of Nottingham, and by Meier et al., *Determination of persistence effects in spatio-temporal patterns of upward long-wave radiation flux density from an urban courtyard by means of time-sequential thermography, Remote Sensing of Environment*, pp. 21-34 (2010) to the courtyards of Berlin, suffers from many acknowledged uncertainties, and is, essentially, uncalibrated and uncalibratable. Despite discussion by Schmidt et al., *Über die Richtungsverteilung der Wärmestrahlung von Oberflächen. Forschung auf dem Gebiet des Ingenieurwesens A*, vol. 6, pp. 175-83 (1935) (hereinafter, Schmidt et al., (1935)), of emissivity variation with viewing angle, the roof pitch (and, thus, sky view factor), and the effects of non-Lambertian emission (variation of emissivity with viewing angle of regard) can only be estimated in the aggregate using current aerial thermography techniques. The techniques of aerial thermography that are known in the art have no bearing on the problem of drive-by thermography, in fact, they are entirely irrelevant to street-level applications.

As practiced, aerial thermography is essentially 2D thermography, where ad hoc corrections are made to account for the failure of the assumptions of 2D radiometry. In particular, the "view factor" $F_{12}$ as defined between two infinitesimal surface elements, is a geometric function describing the space angle subtended by one differential area $dA_1$ with respect to a second differential area $dA_2$, as well-known and thoroughly covered by Modest, *Radiative Heat Transfer* (2d ed., 2003), pp. 145-49, for example. Rigorously, the view factor is given by $$F_{12} = \frac{\cos\theta_1 \cos\theta_2}{\pi S^2} dA_2.$$

where $\theta_i$ is the angle between a line connecting differential elements $dA_i$ and the normals to the respective elements, and S is the distance between the elements. In 2D radiometry, since one cannot know, or account for, the relative orientation of surfaces, $\theta_i$ are assumed to be identically zero. Thus, for example, the emitting surface is deemed parallel to the sensing plane, and at a fixed distance. Moreover, 2D thermography assumes a constant emissivity for all points on a long wave infrared image.

Previous forays into 3D thermography have adopted one or more of a number of stratagems: they have addressed isolated, static objects (thereby obviating many geometrical complexity issues), or have exploited the inherent stereoscopic characteristic of multiple thermal cameras, or, else, have combined the data of a thermal camera with data of one or more digital visible images in order to infer 3D characteristics of a scene. 3D thermography of isolated and static objects is described by Kapoor et al., *Comparison of Techniques for the 3D Modeling and Thermal Analysis, APEGA* 2010, pp. 163-173 (2010), and by Shao, *Detecting Sources of Heat Loss in Residential Buildings from Infrared Imaging*, (MIT Undergraduate Thesis, 2011), both of which are incorporated herein by reference.

It is desirable, however, to provide a mechanism for accurate (real time, nearly real-time, or post processing) analysis of radiometric data obtained in an urban environment on a drive-by basis. The techniques of radiometric analysis, employed to date, however, are far too cumbersome for this purpose, employing either imaging by multiple cameras and/or imaging modalities or explicit distance-measuring modalities, or else invoking averaged calibration factors rather than object- and scene-specific complex geometries. The resolution of the drive-by thermography problem has had to await the novel techniques claimed herein, and described for the first time in the present patent document, and in Phan, *Automated Rapid Thermal Imaging Systems Technology*, (MIT Ph.D. Dissertation, 2012, unpublished as of the present filing), which is filed herewith as an Appendix, and which is incorporated herein by reference.

SUMMARY OF EMBODIMENTS OF THE INVENTION

Accordingly, embodiments of the present invention teach a novel approach to radiometry as it relates to inferring temperature based on the measured radiance in complex 3D environments and correcting for non-Lambertian behaviors of such environments, as experienced when performing drive-by imaging. In accordance with certain embodiments of the invention, methods are provided for deriving temperature information with respect to surfaces imaged radiometrically by means of a radiometric camera in motion with respect to the imaged surfaces. Such methods have steps of:
  a. acquiring and storing a time sequence of frames of radiometric data including a plurality of radiometric images from distinct angles of a scene containing the surfaces;
  b. modeling a 3D structure of the scene;
  c. inferring viewing angles and distances to the imaged surfaces based on the modeled 3D structure;
  d. calculating normalized surface areas of the imaged surfaces based on the inferred viewing angles;
  e. correcting emissivities of the imaged surfaces based on the inferred viewing angles; and
  f. converting the radiometric data to a perceptible temperature map of the imaged surfaces.

In some embodiments of the invention, the step of modeling the 3D structure of the scene is performed using optical flow analysis. In certain embodiments of the invention, the step of acquiring a time sequence of frames may be performed by means of an infrared radiometric camera. There may be an additional step of correcting the radiometric data to account for background radiation impinging upon the imaged surfaces.

In further embodiments of the present invention, acquisition and storage of radiometric data may be performed by means of a camera disposed on a vehicle traversing the imaged surfaces at street level.

An additional step, in accordance with yet further embodiments, may include calibrating an infrared camera in order to acquire the radiometric data.

In accordance with alternate embodiments of the present invention, a computer program product is provided for deriving temperature information with respect to surfaces that are imaged radiometrically by means of a camera in motion with respect to the imaged surfaces. The computer program product has a computer usable medium containing a computer readable program code that includes:
  a computer code module for storing a time sequence of images of the surfaces at a plurality of positions;
  a computer code module modeling a 3D structure of the scene based upon optical flow analysis of the plurality of radiometric images;
  a computer code module for inferring viewing angles and distances to the imaged surfaces based on the modeled 3D structure;
  a computer code module for calculating normalized surface areas of the imaged surfaces based on the inferred viewing angles;
  a computer code module for correcting emissivities of the imaged surfaces based on the inferred viewing angles; and
  a computer code module for converting the radiometric data to a perceptible temperature map of the imaged surfaces.

BRIEF DESCRIPTION OF THE DRAWINGS

The present patent or application file contains at least one drawing executed in color. Copies of this patent with color drawing(s) will be provided by the Patent and Trademark Office upon request and payment of necessary fee.

The foregoing features of the invention will be more readily understood from the following detailed description, considered with reference to the accompanying drawings, in which.

DETAILED DESCRIPTION OF SPECIFIC EMBODIMENTS

Further definitions. As used in this description and the accompanying claims, the following term shall have the meanings indicated, unless the context otherwise requires:

The term "image" shall refer to any multidimensional representation, whether in tangible or otherwise perceptible form, or otherwise, whereby a value of some characteristic (such as radiance, brightness, temperature, etc.) is associated with each of a plurality of locations corresponding to dimensional coordinates of an object in physical space, though not necessarily mapped one-to-one thereonto. Thus, for example, the graphic display of the spatial distribution of some field, either scalar or vectorial, such as brightness or color, constitutes an image. So, also, does an array of numbers in a computer memory or holographic medium. Similarly, "imaging" refers to the rendering of a stated physical characteristic in terms of one or more images.

The term "object" shall refer to a tangible, non-transient, physical object capable of being rendered as an image. The object may be a building or other structure, for example. The term "scene" encompasses one or more objects within a field of view of a sensor.

A conceptual breakthrough by the present inventors, leading to embodiments of the invention described herein, was the insight that it is possible to infer three-dimensional data with respect to objects in an imaged scene using the self-same infrared imaging device used for radiometric analysis. This enables drive-by thermography, since analysis of the data may be performed efficiently and in a scalable and inexpensive way.

Figure 1:
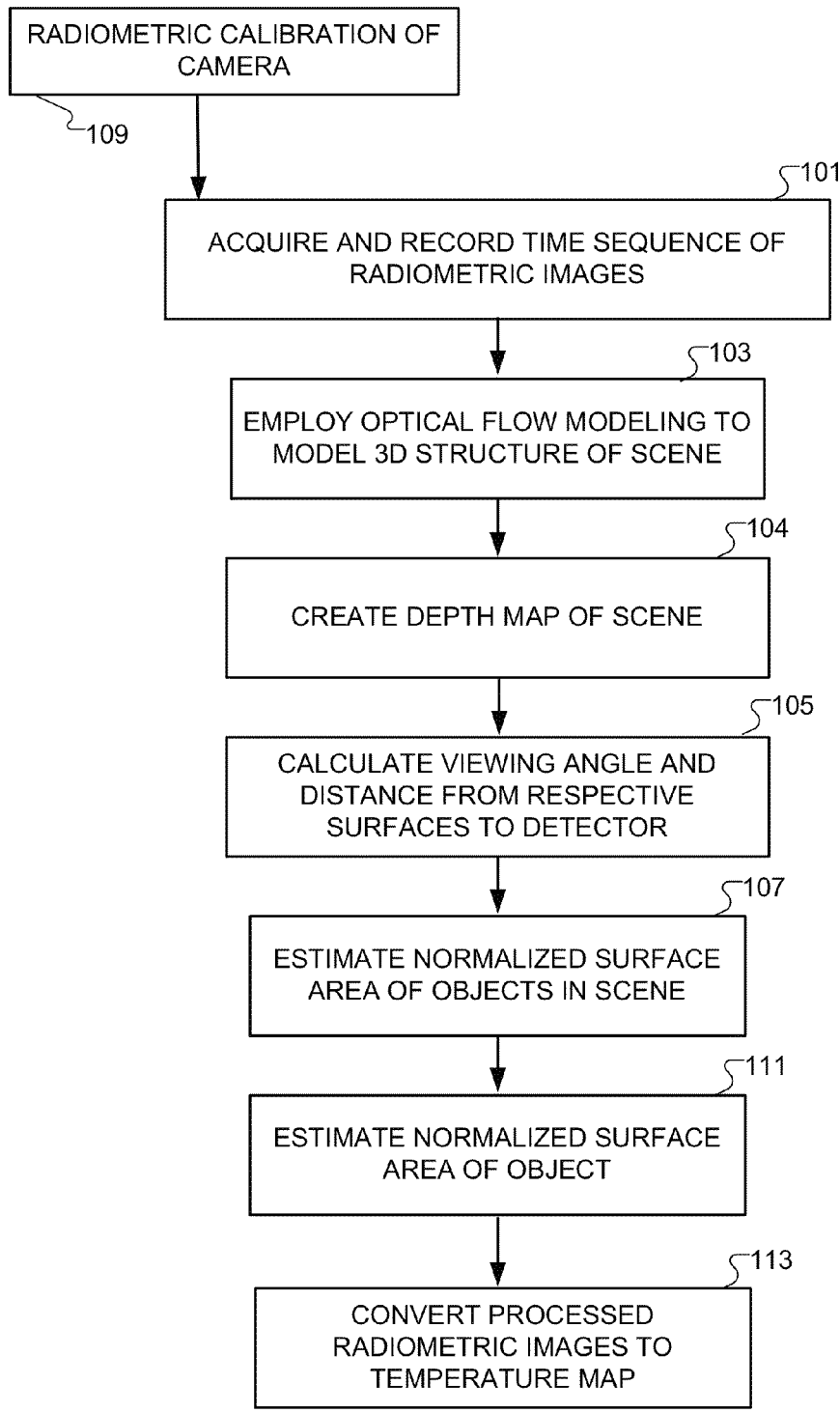
FIG. 1 is a flowchart depicting steps in practice of an embodiment of the present invention.

Methods in accordance with preferred embodiments of the present invention are now described with reference to the flowchart of FIG. 1. Such methods typically employ a sensor, such as an array of LWIR microbolometers, to acquire a time sequence of radiometric images of a scene as the sensor is moved past the scene along a linear trajectory or otherwise. Typically, in accordance with preferred embodiments of the invention, an uncooled detector is preferred, on grounds of lifetime and economy of operation, and, more particularly, a vanadium oxide detector, such as model UC640-17, available from DRS Technologies of Parsippany, N.J., is preferred. Where a photometric or other non-radiometric detector is employed, a thermal calibration is performed, as known in the art.

A detector, such as the one described above by way of example, is mounted on a vehicle that typically travels on urban streets. It is to be understood that the drive-by applications described herein are presented by way of example, and that principles in accordance with the present invention may be employed in many contexts, including airborne imagery, for piloted aircraft or autonomous vehicles.

Data from the detector are acquired and recorded (in step 101) as a time sequence of radiometric images taken from distinct angles, at a rate optimized for the application. In a preferred embodiment of the invention, a frame rate of 30 frames per second is employed, as governed by the detector frame capture rate.

The 3D structure of the scene is then modeled (103) using techniques of optical flow modeling, as described, for example, by Horn et al., *Determining Optical Flow, Artificial Intelligence*, vol. 17, pp. 185-203 (1981), which is incorporated herein by reference, and in many subsequent references. Furukawa et al., *Accurate, Dense, and Robust Multi-View Stereopsis, IEEE Trans. Pattern Analysis and Machine Intelligence*, vol. 32, pp. 1362-76 (2010), also incorporated herein by reference, showed that a single imaging modality, such as a camera, may be used to obtain a time sequence derived from multiple viewing angles relative to a single scene, in order to derive three-dimensional image models of the scene. Any optical flow algorithm employed to obtain a 3D model of the imaged scene is within the scope of the present invention. It is to be understood that 3D modeling may also be achieved other than by optical flow analysis, within the scope of the present invention.

A preferred method of 3D modeling based on optical flow is described by Farnebäck, *Two-frame motion estimation based on polynomial expansion, Image Analysis*, vol. 2749, pp. 363-70 (2003), incorporated herein by reference. In accordance with Farneback, a polynomial expansion function is used to define an approximate neighborhood of each pixel, and, within each neighborhood, a search algorithm minimizes the difference in displacement between a projection of the first frame and the second frame.

From the motion flow modeling of step 103, pixel motion is translated into a depth map (104) using techniques well-known in the art. The depth map is used to create an overlaying solid mesh map, which, in turn, is used to infer the viewing angle and distances from respective surfaces to the detector (105).

Once the viewing angle and distance to the surface have been calculated, the actual size of the remote object is readily obtained using the physical size of elements of the focal plane detector array and simple geometry. In particular, the normalized surface areas of objects in the scene can be estimated (107) based on images at different viewing angles obtained in successive frames of the same time sequence of images.

In cases where a LWIR camera system is used to obtain thermal images, it must be calibrated, in step 109. Various standard radiometric calibration procedures may be employed, such as taught by Liebmann et al., *Infrared Calibration Development at Fluke Corporation Hart Scientific Division*, Proc. Soc. Photo-Optical Instrumentation Engineers (2008), incorporated herein by reference. From such calibration procedures, known in the art, the effective detector emissivity and gain may be derived, deriving, in particular, a mapping of signal output (pixel intensity) to observed radiance.

In order to impute a radiation temperature to a surface, its emissivity must be known or assumed. In accordance with embodiments of the present invention, a directional correction factor is introduced to correct for situations where observed emissions are non-uniform since, as is well-known, the emissivity of a surface will vary with view angle, representing excursions from isotropic emissivity and Lambertian cosine-law reflectivity. The non-Lambertian behavior of emissivity has been studied since Schmidt et al., (1935). Accordingly, an empirical directional correct factor $g(\theta)$ is applied (in step 111) to account for non-Lambertian behavior of non-metallic surfaces.

Figure 2:
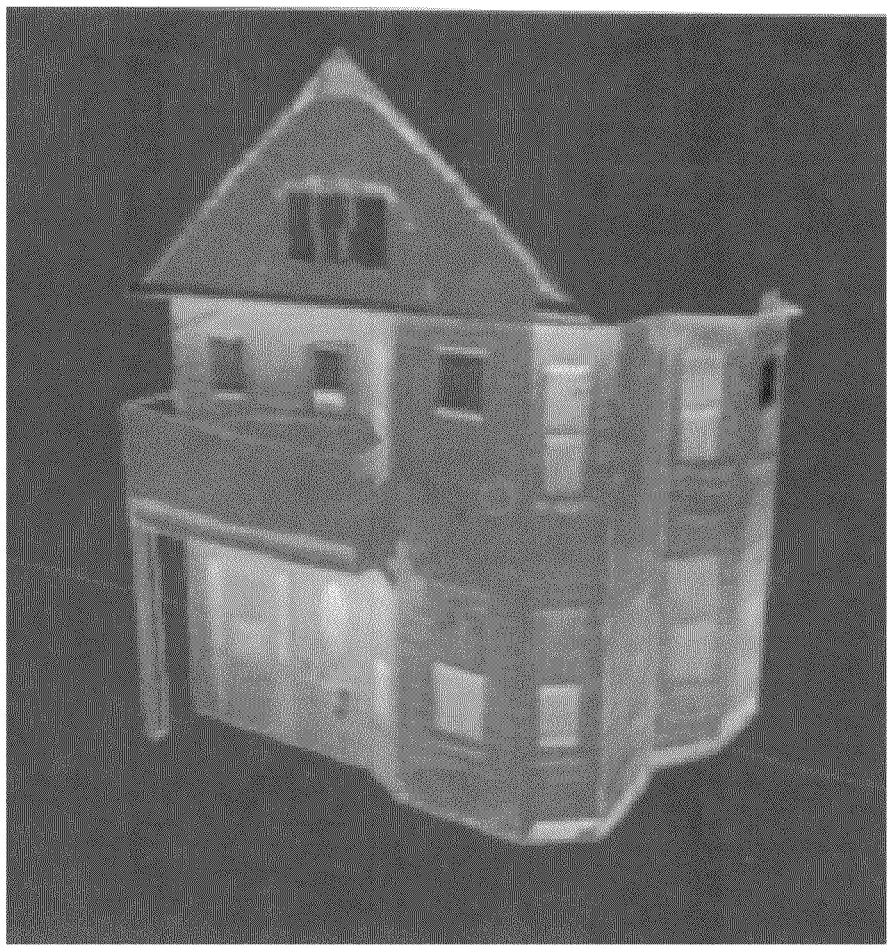
FIG. 2 depicts, in false color, a thermogram of a building based on drive-by radiometry in accordance with an embodiment of the present invention.

In order to include the effects of background radiation and reflections from nearby objects impinging upon an imaged surface, the radiance attributed to a surface of emissivity $\epsilon_r$ may be expressed in the following form:

$$S_r(T_0) = \epsilon_r \tilde{S}(T_0) + (1-\epsilon_r)\tilde{S}(T_b),$$

where $S_r(T_0)$ is the observed radiance, $\tilde{S}$ is the total radiance of a blackbody at the temperature $T_0$ of the surface in question, $(1-\epsilon_r)$ is the reflection of the surface, and $T_b$ is the background temperature. While, if the temperatures of the surface and the background are substantially the same, the correction for background temperature is small, in cases where the emissivity is low and the background temperature exceeds the surface temperature, the background may become a critical factor in determining the observed signal at the detector. Once the observed scene has been modeled in 3D and emissivity corrections applied, the measured radiance, as derived from multiple drive-by views and subsequently processed, may be converted to a temperature map (113) using standard techniques. An example of a 3D radiometry-based thermogram of a structure, obtained by applying a method in accordance with FIG. 1, is shown in FIG. 2. Temperatures range from cooler (blue) to warmer (red).

The temperature map, or thermogram, once generated, is provided to a user in a perceptible form, such as a visual display, as shown in FIG. 2, for example.

While embodiments of the present invention have described a motion-based approach to reconstructing the 3D environment, it is to be understood that them may also be supplemented by alternative methods such as LIDAR, stereo vision, etc.

In preferred embodiments of the present invention, the disclosed methods of infrared thermography are implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

What is claimed is:

1. A method for deriving temperature information with respect to surfaces imaged radiometrically by means of a radiometric camera in motion with respect to the imaged surfaces, the method comprising:
   a. acquiring and storing a time sequence of frames of radiometric data including a plurality of radiometric images from distinct angles of a scene containing the surfaces;
   b. modeling a 3D structure of the scene;
   c. inferring viewing angles and distances to the imaged surfaces based on the modeled 3D structure;
   d. calculating normalized surface areas of the imaged surfaces based on the inferred viewing angles;
   e. correcting emissivities of the imaged surfaces based on the inferred viewing angles; and
   f. converting the radiometric data to a perceptible temperature map of the imaged surfaces.

2. A method in accordance with claim 1, wherein modeling the 3D structure of the scene is performed using optical flow analysis.

3. A method in accordance with claim 1, wherein acquiring is performed by means of an infrared radiometric camera.

4. A method in accordance with claim 1, further comprising correcting the radiometric data to account for background radiation impinging upon the imaged surfaces.

5. A method in accordance with claim 1, wherein the acquiring and storing are performed by means of a camera disposed on a vehicle traversing the imaged surfaces at street level.

6. A method in accordance with claim 1, further comprising a step of calibrating an infrared camera in order to acquire the radiometric data.

7. A computer program product for deriving temperature information with respect to surfaces imaged radiometrically by means of a camera in motion with respect to the imaged surfaces, the computer program product comprising a non-transitory computer usable medium having computer readable program code thereon, the computer readable program code including:
   a. a computer code module for storing a time sequence of images of the surfaces at a plurality of positions;
   b. a computer code module for modeling a 3D structure of the scene;
   c. a computer code module for inferring viewing angles and distances to the imaged surfaces based on the modeled 3D structure; d. a computer code module for calculating normalized surface areas of the imaged surfaces based on the inferred viewing angles;
   e. a computer code module for correcting emissivities of the imaged surfaces based on the inferred viewing angles; and f. a computer code module for converting the radiometric data to a perceptible temperature map of the imaged surfaces.

8. A computer program product in accordance with claim 7, wherein the computer code module for modeling the 3D structure of the scene is based upon optical flow analysis of the plurality of radiometric images.

* * * * *